July 2, 1957 J. J. P. VALETON 2,798,155
CIRCUIT ARRANGEMENT FOR PRODUCING A VARIABLE HIGH DIRECT VOLTAGE
Filed Nov. 20, 1953
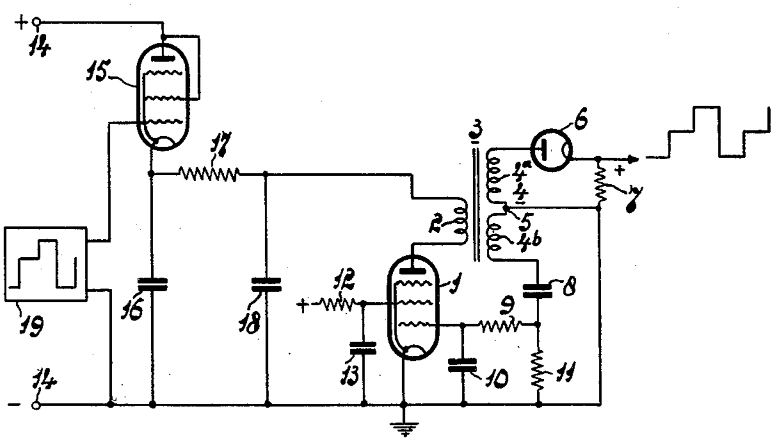
INVENTOR
JOSUE JEAN PHILIPPE VALETON
BY [signature]
AGENT United States Patent Office 2,798,155
Patented July 2, 1957

2,798,155

CIRCUIT ARRANGEMENT FOR PRODUCING A VARIABLE HIGH DIRECT VOLTAGE

Josué Jean Philippe Valeton, Eindhoven, Netherlands, assignor, by mesne assignments, to North American Philips Company, Inc., New York, N. Y., a corporation of Delaware Application November 20, 1953, Serial No. 393,480

Claims priority, application Netherlands December 1, 1952

4 Claims. (Cl. 250—27)

The present invention relates to a circuit arrangement for producing a high direct voltage. More particularly, the invention relates to a circuit arrangement for producing a variable high direct voltage by rectifying the alternating voltage produced by an oscillator.

In the circuit arrangement according to the invention, the amplitude of the alternating voltage varies with the anode supply voltage of an oscillator tube and said anode supply voltage is varied stepwise.

In the circuit arrangement according to the invention, the high direct voltage produced is therefore varied stepwise. Such a stepwise variable high direct voltage may, for example, be used in color television camera tubes or reproducing tubes, in which the cathode-ray beam is subjected not only to the horizontal and vertical deflections used also in black-white television, but also to a stepwise deflection. The latter deflection may, for example, be used for selecting one of three adjacent lines of the screen of the cathode-ray tube, each of which corresponds to a different color.

For this purpose, it has been suggested to provide a frame of parallel conductors in the tube closely in front of the screen of the cathode ray tube. In the proximity of such conductors the beam is subjected to an additional deflection, which varies with the potential applied to the conductors.

A reliable variation of the potential may be obtained, if the amplitude of the alternating voltage produced by the oscillator varies substantially linearly with the anode supply voltage of the oscillator tube.

In one embodiment of the circuit arrangement according to the invention, the oscillator tube is a screen-grid tube and is adjusted in a manner such that the amplitude of the alternating voltage produced is limited by the steep part of the anode-current-anode-voltage characteristic curve of the tube.

It is required that the high direct voltage produced be variable by a fixed amount and that the voltage produced always be sufficiently smoothed.

For this purpose, the rectifying circuit is constituted for example by a single rectifying stage. Moreover, the frequency of the alternating voltage produced is chosen to be so high, for example 100 kilocycles per second, that smoothing is not required in the rectifying circuit, since the parasitic capacity of the resistor included in the rectifying circuit is sufficient.

In order that the invention may be readily carried into effect, it will now be described with reference to the accompanying drawing, wherein the single figure is a schematic diagram of an embodiment of the circuit arrangement of the present invention.

The oscillator tube 1, constructed in the form of a screen-grid tube, is included in a Hartley oscillator circuit. The anode circuit of the tube 1 includes the primary winding 2 of a transformer 3. The secondary winding 4 of the transformer 3 has a tapping point 5, which is connected to ground. To the part 4ª of the secondary winding 4 is connected the rectifying circuit comprising the series combination of a diode 6 and a resistor 7.

The bottom end of the part $4^b$ of the secondary winding 4 is connected through the capacitor 8 and the resistor 9 to the control-grid of the tube 1. Said control-grid is connected to ground through the capacitor 10, and the junction of the capacitor 8 and the resistor 9 is connected to ground through a resistor 11. The screen grid of the tube 1 is connected through the resistor 12, which is bypassed for alternating voltages via a capacitor 13, to the positive terminal of a direct voltage source of, for example, 300 volts.

Between the terminals 14 of a supply source of, for example, 500 volts, is provided the series combination of a tube 15 and a capacitor 16. A smoothing network comprising a resistor 17 and a capacitor 18 is connected in parallel with the capacitor 16.

The series combination of the primary winding 2 of the transformer 3 and the oscillator tube 1 is connected to the capacitor 18.

A generator 19 for producing a stepwise voltage is connected between the control-grid of the tube 15 and ground. The generator 19 may be of known construction. The tube 15 is consequently connected as a cathode-follower, so that at a variation of the control-grid voltage with respect to ground, the cathode of the tube is subjected to this variation. In order to obtain a rapid variation of the voltage at the capacitor 16 with a stepwise variation of the control-grid voltage, the capacity of the capacitor 16 must not be too high. In a circuit tested in practice this capacity was 1000 micromicrofarads.

The time constant of the network 17, 18 must not be too high. In the example indicated, the value of the resistor 17 was about 5000 ohms and the capacity of the capacitor 18 was 680 micromicrofarads.

If the output voltage of the generator 19 varies stepwise, the voltage of the capacitor 18 also varies stepwise, this capacitor voltage constituting the anode supply voltage for the oscillator circuit. Hence, the amplitude of the alternating voltages produced by the oscillator with a frequency of, for example, 100 kilocycles per second, also, varies stepwise, substantially proportionally to the variation of the output voltage of the generator 19.

Since the high direct voltage produced across the resistor 7 is substantially determined by the amplitude of the oscillations produced by the oscillator, this direct voltage also varies substantially proportionally to the output voltage of the generator 19.

Due to the absence of the separate smoothing capacitors in the rectifying circuit, the rectified voltage varies sufficiently rapidly. The circuit indicated is capable of producing a high direct voltage, which was 6, 8 and 10 kilovolts in succession, each voltage being maintained for $\frac{1}{100}$ second or as long as was desired.

While the invention has been described by means of a specific example and in a specific embodiment, I do not wish to be limited therein, for obvious modifications will occur to those skilled in the art without departing from the spirit and scope of the invention.

What is claimed is:

1. A circuit-arrangement for producing a high direct voltage having cyclic variations of the intensity thereof recurring in a stepwise manner and at a first given frequency, comprising an oscillator for producing an alternating voltage having a second given frequency substantially greater than said first given frequency, said oscillator comprising an electron discharge tube having an anode, means including a source of anode voltage for energizing said oscillator thereby to produce said alternating voltage at an intensity determined by the intensity of said anode voltage, rectifying means, means for coupling said rectifying means to said oscillator for producing a high direct voltage having an intensity determined by the intensity of said alternating voltage, and means for cyclically varying the intensity of said anode voltage in a stepwise manner and at said first given frequency value thereby to cyclically vary the intensity of said high direct voltage in a stepwise manner and at the said first given frequency value.

2. A circuit-arrangement as set forth in claim 1, wherein said discharge tube is constituted by a screen grid tube adapted to produce an alternating voltage having an amplitude limited by the steep part of the anode current-anode voltage characteristic curve of said tube.

3. A circuit-arrangement as set forth in claim 1, wherein said coupling means includes a transformer and wherein said rectifying means includes only a rectifier and a resistor connected in series with said rectifier, said oscillator producing an alternating voltage having a frequency value at which a smooth high direct voltage is produced across said resistor.

4. A circuit-arrangement as set forth in claim 1, wherein said oscillator further includes a capacitor and said discharge tube further includes a control grid, wherein said coupling means includes a transformer having a primary winding and a secondary winding having two sections, said primary winding being connected to said anode in series with said tube, said rectifying means being connected to one of the two sections of said secondary winding, the other of said two sections being connected through said capacitor to the control grid of said tube, the junction point of said two sections being connected to a point of constant potential, and wherein said means for energizing said oscillator further includes a series combination of a second capacitor and a second electron discharge tube having a control grid, means for applying a step wave voltage to said control grid, and a smoothing filter, the series combination of said primary winding and said first tube being connected to said second capacitor through said smoothing filter.

References Cited in the file of this patent

UNITED STATES PATENTS

| | | |
|---|---|---|
| 1,463,433 | Nichols | July 31, 1923 |
| 1,837,144 | Bethenod | Dec. 5, 1931 |
| 2,144,237 | Wohlfarth et al. | Jan. 17, 1939 |
| 2,374,781 | Schade | May 1, 1945 |
| 2,474,040 | Day | June 21, 1949 |
| 2,667,614 | Covill | Jan. 26, 1954 |